US007836240B2

United States Patent
Schoegler

(10) Patent No.: US 7,836,240 B2
(45) Date of Patent: Nov. 16, 2010

(54) INTERFACE ARRANGEMENT FOR A SYSTEM ON A CHIP SUITABLE FOR OUTPUTTING HIGHER-FREQUENCY SIGNALS FOR OPERATING PERIPHERAL DEVICES, AND USE THEREOF

(75) Inventor: Werner Schoegler, Graz (AT)

(73) Assignee: Austriamicrosystems AG, Unterpremstätten (AT)

( * ) Notice: Subject to any disclaimer, the term of this patent is extended or adjusted under 35 U.S.C. 154(b) by 30 days.

(21) Appl. No.: 11/921,921

(22) PCT Filed: Jun. 6, 2006

(86) PCT No.: PCT/EP2006/005374

§ 371 (c)(1),
(2), (4) Date: Oct. 9, 2008

(87) PCT Pub. No.: WO2006/131307

PCT Pub. Date: Dec. 14, 2006

(65) Prior Publication Data

US 2009/0125663 A1 May 14, 2009

(30) Foreign Application Priority Data

Jun. 8, 2005 (DE) .................. 10 2005 026 436

(51) Int. Cl.
*G06F 13/40* (2006.01)
(52) U.S. Cl. .................. 710/305; 710/308; 710/310
(58) Field of Classification Search ......... 710/306–315, 710/22–23, 29, 31, 36–37
See application file for complete search history.

(56) References Cited

U.S. PATENT DOCUMENTS

| 6,055,598 | A | * | 4/2000 | Lange | ......................... 710/310 |
| 6,484,218 | B1 | | 11/2002 | Pipho | |
| 6,633,927 | B1 | | 10/2003 | Jackson et al. | |
| 6,636,927 | B1 | * | 10/2003 | Peters et al. | ................. 710/309 |
| 6,742,063 | B1 | | 5/2004 | Hellum et al. | |
| 6,757,762 | B1 | | 6/2004 | McCarthy et al. | |

(Continued)

FOREIGN PATENT DOCUMENTS

WO   WO 03/023625   3/2003

(Continued)

OTHER PUBLICATIONS

ARM Limited, ARM PrimeCell General Purpose Input/Output (PL061) Technical Reference Manual, 2000.*

(Continued)

*Primary Examiner*—Raymond N Phan
(74) *Attorney, Agent, or Firm*—Cohen Pontant Lieberman & Pavane LLP

(57) ABSTRACT

An interface arrangement (24) is disclosed that provides an interface between a signal line (5) for connecting external peripheral devices and a microcontroller bus (3). Data input and output interfaces (1, 2; 4) are provided for connecting corresponding register units (6, 7) to the bus systems (3, 5) and are connected through a buffer memory (8). This is, moreover, coupled with a direct memory access (DMA) controller (9). A control signal generator is also provided for the flexible generation of control signals (10). The proposed arrangement thus permits a high data transfer rate when operating peripheral devices with a system-on-chip, without demanding computing time from the microcontroller.

18 Claims, 3 Drawing Sheets

U.S. PATENT DOCUMENTS

| | | | | |
|---|---|---|---|---|
| 6,816,750 | B1 * | 11/2004 | Klaas | 700/121 |
| 6,898,659 | B2 * | 5/2005 | Yoo et al. | 710/306 |
| 7,246,188 | B2 * | 7/2007 | Ganasan et al. | 710/241 |
| 2002/0038393 | A1 * | 3/2002 | Ganapathy et al. | 710/22 |
| 2002/0133662 | A1 * | 9/2002 | Cheung | 710/310 |
| 2003/0061431 | A1 * | 3/2003 | Mears et al. | 710/305 |
| 2006/0179192 | A1 * | 8/2006 | Ganasan et al. | 710/110 |
| 2007/0174513 | A1 * | 7/2007 | Wrigley et al. | 710/52 |

FOREIGN PATENT DOCUMENTS

WO    WO 2004/053717    6/2004

OTHER PUBLICATIONS

ARM Prime Cell™, General Purpose Input/Output (PL 061), Technical Reference Manual, ARM Limited pp. 2-4, 2000.

* cited by examiner

| | | | | |
|---|---|---|---|---|
| s1: (NRZ) | p1, p2, p3=0, 1, 1; | T12=4 | T23=4 |
| s2: (RZ) | p1, p2, p3=0, 1, 0; | T12=6 | T23=10 |
| s3: (NRO) | p1, p2, p3=1, 0, 0; | T12=4 | T23=4 |
| s4: (RO) | p1, p2, p3=1, 0, 1; | T12=5 | T23=11 | s1: idle=0; mask=0, 0, 0, 0
s2: idle=0; mask=1, 1, 0, 0
s3: idle=1; mask=0, 1, 0, 1
s4: idle=0; mask=1, 1, 1, 0

Idle and mask Definitions

INTERFACE ARRANGEMENT FOR A SYSTEM ON A CHIP SUITABLE FOR OUTPUTTING HIGHER-FREQUENCY SIGNALS FOR OPERATING PERIPHERAL DEVICES, AND USE THEREOF

RELATED APPLICATIONS

This is a U.S. national stage of application No. PCT/EP2006/005374, filed on 06 Jun. 2006.

This patent application claims the priority of German patent application no. 10 2005 026 436.0 filed Jun. 8, 2005, the disclosure content of which is hereby incorporated by reference.

FIELD OF THE INVENTION

The present invention concerns an interface arrangement, in particular for a system-on-chip, comprising a first data input and output interface, designed for connection to a microcontroller bus, a second data input and output interface designed for the connection of a signal line that provides coupling to peripheral devices, a first register unit joined to the first data input and output interface, and a second register unit joined to the second data input and output interface, along with their use.

BACKGROUND OF THE INVENTION

An interface arrangement of this general type is illustrated, for instance, in the document "ARM PrimeCell™, General Purpose Input/Output (PL 061), Technical Reference Manual, ARM Ltd, 2000" on page 2-4 in FIG. 2-1.

An interface arrangement of that type serves to couple a microprocessor or a microcontroller bus to an interface that is provided for the connection of peripheral devices such as, for instance, displays.

Universal interface arrangements of this type for external peripheral devices are used, for instance, in what is known as the system-on-chip.

System-on-chip, also known as system-on-a-chip or SOC, normally refers to a chip that incorporates the necessary hardware and electronic circuits for a complete system. An SOC comprises, on this one chip, memory such as RAM (random access memory) or ROM (read-only memory), a microprocessor or microcontroller, interfaces for peripheral devices, control logic for data input and output, data converters and other components that are part of a complete computer system. SOCs of this type can be used, for instance, in mobile telephones, digital cameras, set-top boxes, personal digital assistants (PDAs) and other applications.

Interface arrangements of this type normally incorporate software-controlled signal generation. The software-controlled generation of all the signal transitions in the required sequence demands a relatively large administrative effort, and this can lead to significant restrictions on the potential performance of the system. The frequency of an output signal generated in this way is limited by the maximum speed of the bus system, which in turn leads to a limitation on the frequency of the output signals and thereby to restricted data throughput.

In particular, however, when driving external components such as displays, a high rate of data throughput from the interface to the peripheral devices is required.

SUMMARY OF THE INVENTION

One object of the present invention is to provide an interface arrangement particularly for a system-on-chip suitable for the output of higher-frequency signals for the operation of peripheral devices, and its use.

This and other objects are attained in accordance with one aspect of the present invention directed to an interface arrangement that is developed beyond the generic interface arrangement described above through having the following features:
- a buffer memory that couples the first register unit to the second register unit,
- a direct memory access controller, connected to the microcontroller bus and to the buffer memory
- a control signal generator provided to generate a control signal, connected to the signal line that provides coupling to peripheral devices and coupled to the second register unit.

According to an embodiment of the invention, direct memory access is on the one hand possible either on the microcontroller bus or to a volatile memory connected to the bus, for instance belonging to a microcontroller, using the direct memory access controller. This is also the purpose of the buffer memory that supports direct memory access using the microcontroller bus. On the other hand, the control signal generator is capable of generating all the control signals needed for the signal line that provides coupling to peripheral devices independently of the microcontroller, and in a favourably programmable manner.

In this way, high data throughput figures can be achieved with minimum software overhead. The control signal generator makes it possible to configure the interface arrangement for a variety of purposes and operating modes. The expense of the hardware required to implement the control signal generator is relatively small.

In particular, extensive flows of data sent to an output device such as a display or to audio or video components can be generated with relatively little effort using the disclosed embodiments of the invention. Great flexibility is permitted for handling differing types of LCD (liquid crystal display) or TFT (thin-film transistor) displays having different bus standards.

As a result of using direct memory access, an embodiment of the present invention permits the transfer of data at high transmission rates between a microcontroller or microprocessor connected to the microcontroller bus and the interface arrangement.

The proposed interface arrangement is particularly suitable for embedded systems such as the system-on-chip devices mentioned at the beginning.

The interface arrangement according to an embodiment of the present invention permits both direct memory access to a memory component connected to a microcontroller bus as well as the generation of control signals on the signal line that provides coupling to peripheral devices. The proposed combination thus permits a higher rate of data throughput, while offering the additional benefit that a microcontroller or microprocessor connected to the microcontroller bus is free for other tasks.

The buffer memory here serves to permit separate clock rates on the microcontroller bus and on the signal line that provides coupling to peripheral devices. The signal line that provides coupling to peripheral devices can therefore be operated at clock frequencies that are independent of the clock of the microcontroller, and, in particular, from the clock of the microcontroller bus.

The control signal generator is favourably connected to the buffer memory in order to operate it. The control signal generator transfers data to and from peripheral devices, quite independently of a microcontroller and of the first data input and output interface.

The first register unit favourably comprises several registers and the control block that is coupled to the registers, in order to operate them, and to the microcontroller bus. The first register unit serves to transfer data to and from the microcontroller bus through the first data input and output interface.

It is, further, favourable for the first register unit to include an interrupt request signal generator, coupled to the microcontroller bus. These signals are also known as IRQ or interrupt signals.

The buffer memory is favourably connected to the interrupt request signal generator in order to operate it.

The first register unit favourably incorporates the direct memory access controller.

The buffer memory is favourably a first-in-first-out memory. Buffer memories of this type are also known as FIFO buffers. The purpose of the buffer memory is, during a direct memory access, to store the data that is to be transferred to the memory that is assigned to the microcontroller or that is to be transferred from it to the interface arrangement. The memory assigned to the microcontroller can here be comprised within the microcontroller or implemented as a separate functional block.

The buffer memory favourably comprises a controller and the actual volatile memory coupled to the controller. The controller is favourably implemented as a FIFO controller.

This controller, comprised within the buffer memory, is favourably connected to the interrupt request signal generator in order to operate it. In addition, the controller is also connected to the direct memory access controller in order to operate it. A control line, furthermore, is favourably provided from the direct memory access controller to the controller comprised within the buffer memory.

The second register unit favourably comprises a data input register and a data output register, as well as an input/output buffer memory. The data input register and the data output register are coupled to the buffer memory. The data input register and the data output register are also coupled to the FIFO buffer memory. The input/output buffer memory is in turn connected to the signal line that provides coupling to peripheral devices in order to control external equipment. The second register unit is here designed for bidirectional data transfer, i.e. for supplying data to, for instance, display units, and for reading data from input devices such as keyboards, touch screens, sensors or similar devices.

The control signal generator favourably comprises a programmable signal generator, a clock generator and a generator for a blanking signal when idle, connected together to create a programmable control signal. Control signals can easily be programmed with the proposed control signal generator in respect, for instance, of the sequence of levels, clock rates, blanking or masking.

The programmable signal generator is favourably connected to the data input register, the data output register and the input/output buffer memory in the second register unit in order to operate them. It is, furthermore, favourable here for an additional control line to be provided from the input/output buffer memory to the programmable signal generator.

The control line from the control signal generator to the buffer memory is provided in a further development between the programmable signal generator and the buffer memory, more preferably between the programmable signal generator and the controller comprised within the buffer memory.

In a favourable further development, the control signal generator comprises a generator for the generation of a sampling signal. A sampling signal of this type is referred to as a strobe signal. The generator for providing a strobe signal is favourably implemented in programmable form.

The control signal generator is favourably designed for the creation of a control signal of at least one or more of the following types: non-return-to-zero (NRZ), return-to-zero (RZ), return-to-one (RO) or non-return-to-one (NRO).

The control signal generator favourably comprises a means for programming a sequence of at least two signal levels, and the means for programming at least one timestamp for the sequence of at least two sequential signal levels. The timestamp favourably serves for switching from a first to a second of several sequential signal levels. Furthermore, the control signal generator favourably includes a means for masking the sequence of at least two sequential signal levels. This makes it possible, with little effort and without the support of the microprocessor or directly of the interface arrangement itself, to generate almost any desired control signals for application to the signal line for coupling with peripheral devices.

In a favourable further development, the microcontroller bus has at least one data line, at least one address line, and at least one control line.

The proposed interface arrangement can favourably be used in a system-on-chip for coupling a microprocessor to one or more peripheral devices.

The chip incorporating the SOC favourably includes one or more of the interface arrangements described.

DETAILED DESCRIPTION OF THE DRAWINGS

Figure 1:
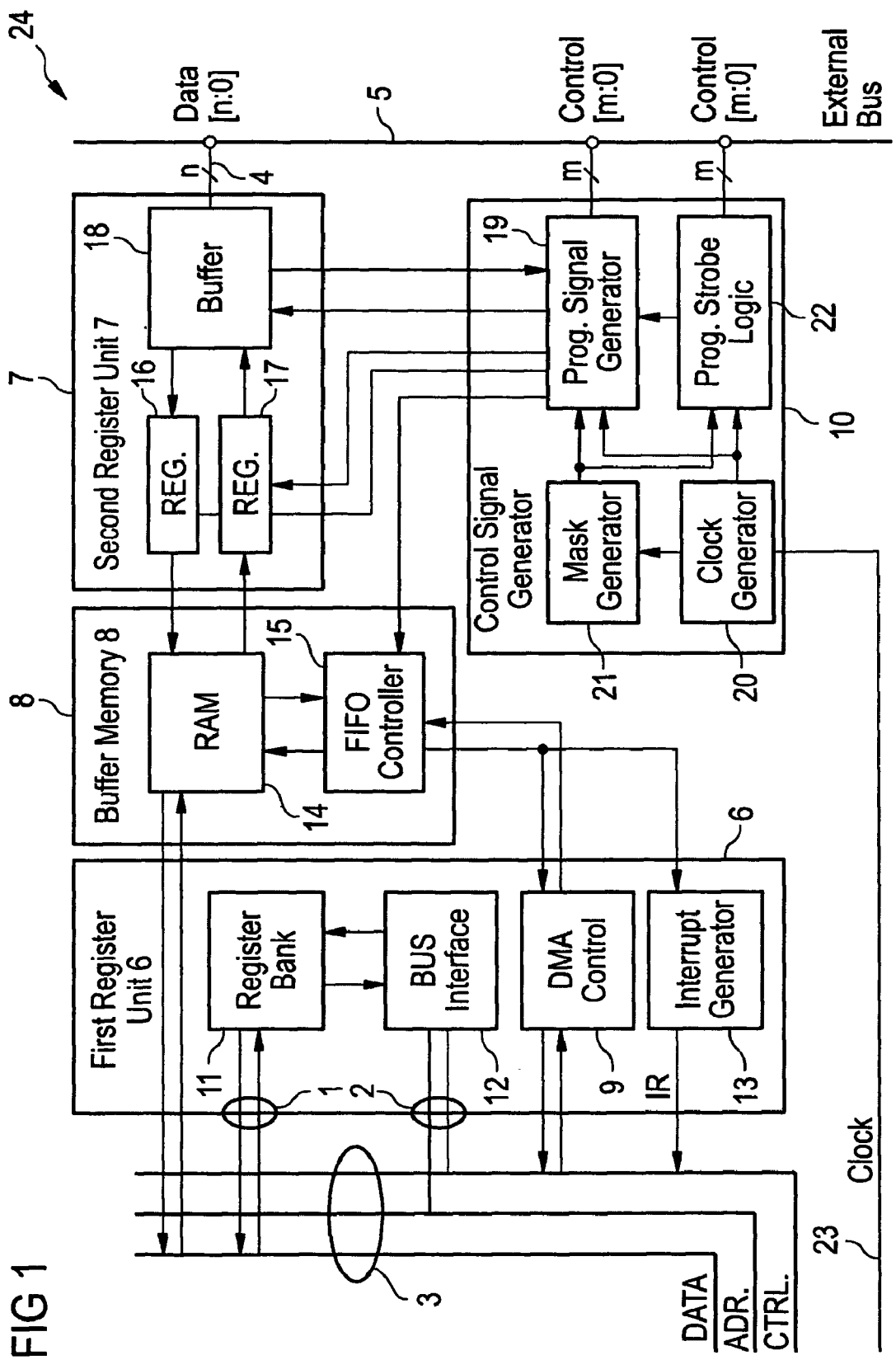
FIG. 1 shows an example of an interface arrangement according to an embodiment of the invention with the aid of a block diagram.

FIG. 1 shows an embodiment of an interface arrangement according to the invention. The interface arrangement comprises a first data input and output interface 1, 2, designed for connection to a microcontroller bus 3. This input/output interface is a microcontroller bus slave interface comprising data, address and control signals. Control and address signals are inputs (therefore slave interface), data signals are input/output signals. The data flow of input/output is controlled by the bus interface. Usually these are dedicated read/write control input signals. The interface arrangement also comprises a second data input and output interface 4, designed for the connection of a signal line 5 for coupling to peripheral devices. The data input/output bus is a n bit parallel IO bus with controllable input/output/tristate behavior. Input, output and tristate behavior is programmed either by (1) control bits within the control register section or (2) by signals coming from the programmable signal generator. (1) enables static control of the IO behavior, with (2) enabling dynamic control. Both the microcontroller bus 3 and the signal line 5 that provides coupling to peripheral devices may be several bits wide. A first register unit 6 is connected to the first data input and output interface 1, 2. A second register unit 7 is connected to the second data input and output interface 4. A buffer memory 8 couples the first register unit 6 to the second register unit 7, bidirectionally in both cases. A controller 9, designed for direct memory access (DMA) is also provided and is connected to the microcontroller bus 3 and the buffer memory 8. The DMA controller 9 is a component that enables the transfer of data to and from the processor system memory or other processor system peripherals. Main purpose of the DMA controller is the transfer of data without the need of the processor itself. A DMA transfer is initiated by programming control registers within the DMA block for the information about the number of bytes that should be transferred, the target adress in memory where the data should be transferred.

The DMA controller is implemented by following blocks:

A slave bus interface with registers to implement control registers for a DMA flow control block to enable communication with peripheral blocks. Peripherals can control the length of the packet that is transferred. Such peripheral blocks can initiate a single transfer or burst transfers;

An interrupt request to inform the microcontroller system about finished DMA transfer jobs;

A master bus interface to access the bus. Usually there are three phases: the bus is requested by the DMA controller, the bus is granted to the DMA controller and DMA transfers take place, and the bus is released between packets.

A control signal generator 10 is provided to generate a control signal, and is connected to the signal line 5 for coupling to peripheral devices and, moreover, to the second register unit 7. The control signal generator 10 is also connected to buffer memory 8 in order to control it.

The first register unit 6 comprises a register bank 11 incorporating several memory registers. In addition, the first register unit 6 comprises a Bus Interface 12 that is connected bidirectionally to the register bank 11 and also, through the first data input and output interface, to the microcontroller bus 3. The BUS interface is the general interface to the microcontroller system and comprises address, data and control line. The invention is not based on a specific structure of the bus interface and can be implemented with any type of standard microcontroller bus interface. Example for such standardized microcontroller bus interfaces are ARM AMBA bus system, opencores Wishbone bus system, and the Motorola CoreConnect. The direct memory access controller 9 is also comprised within the first register unit 6, as is a generator 13 for the generation of interrupt request signals. The interrupt controller is a component generating an interrupt signal. Several parameters for the interrupt are programmable: sources of interrupt can be selected (FiFo buffer empty/almost empty/half full/almost full/full) and the form of the generated interrupt signal can be defined: low active/high active, edge sensitive/level sensitive. The generator 13 is connected via a control line to a control line of the microcontroller bus 3. Control lines are also provided with which it is possible to operate both the direct memory access controller 9 and the generator for generating interrupt request signals 13 by the buffer memory 8. The control lines are between buffer 8 on the one hand and DMA controller 9 as well as IRQ generator 13 on the other hand.

The buffer memory 8 itself comprises a random access memory 14 (RAM). The buffer memory 8 also comprises a FIFO controller 15 which is bidirectionally connected to the memory 14. This controller 15 is connected to the controller 9 and the generator 13 in order to operate them. The connection of the buffer memory 8 to the microcontroller bus 3 is made to the memory 14 that is implemented as a first-in-first-out (FIFO) buffer, and is operated by the controller 15. As a FIFO memory, the first value that is stored is also the first one that can be read out.

The second register unit 7 incorporates a data input register 16 and a data output register 17 which are coupled to the memory 14 of the buffer memory 8 in order to transfer data in their respective directions. An input/output buffer memory 18 is also provided to connect the data input register 16 and the data output register 17 to the second data input and output interface 4.

The control signal generator 10 incorporates, in addition to the programmable signal generator 19 itself, a clock generator 20, a generator for blanking 21 and a generator 22 to provide a sampling strobe. The programmable signal generator is a component that generates signals according to the information stored in registers. The structure of the programmable signal generator is described in detail in FIG. 2. The generator 22 is also programmable. The blanking generator is used to generate control signals that differ within consecutive cycles. The mask generator comprises a programmable counter and a mask logic to mask out control signals for specific cycles. For the data input, a strobe signal should be generated that defines the time point at which the data are read into the input register. The clock generator 20 is connected to an external clock terminal 23 which provides a reference clock to the clock generator 20. The clock generator 20 is also connected to the blanking generator 21 in order to operate it, and with the programmable signal generator 19 as well as the sampling strobe generator 22 to supply each with its clock signal. The blanking generator 21 controls the programmable signal generator 19 and the programmable strobe signal generator 22 through appropriate connections. Generator 22, in turn, is connected by a control line to the programmable signal generator 19. The programmable signal generator 19 is bidirectionally coupled to the input/output buffer memory 18. The programmable signal generator 19 moreover is connected through control lines to the data input register 16 and the data output register 17 as well as to the controller 15 in the buffer memory 8. The control and sampling strobe signals generated are carried on control connections, each of which is several bits wide, that connect the programmable signal generator 19 and also the sampling strobe generator 22 to the signal line 5 for coupling to peripheral devices.

The first register unit 6 performs access on the microcontroller bus 3 to the registers it comprises in register bank 11, data transfer in the context of direct memory access, DMA, to and from buffer memory 8 and to and from the microcontroller memory components, not shown, that are connected to the microcontroller bus 3. The first register unit 6 also serves to generate interrupt request signals and to control the read/write access, and for reading and writing status signals. The buffer memory 8 here stores all the data that are sent or received in the context of direct memory access.

The control signal generator 10 serves to generate all the control signals for signal line 5 for coupling to peripheral devices, which is also implemented in the form of a bus, the timing of these signals being controllable. In addition, programmable strobe signals for reading data via interface 4 are generated. These strobe signals can, of course, be triggered by external signals.

The first register unit 6 performs all the necessary interface tasks that are normally found on the bus systems of modern microcontrollers. In addition, register unit 6 supports direct memory access for operating or reading peripheral devices through the proposed interface arrangement. This is particularly used for transferring large blocks of data. The controller 9 for performing direct memory access can here be configured either as what is known as a DMA host or as a DMA slave. In the case of the DMA host, the controller 9 controls the entire data flow involved in the direct memory access. In this case the controller 9 controls a continuous data transfer. Whenever the buffer memory 8 is empty or nearly empty of stored data, direct memory access is triggered by the controller 9, and data from a main memory connected to the bus is transferred to the buffer memory, continuing until buffer memory 8 is full. It is not necessary here to generate an interrupt request, because the controller 9, as the DMA master or DMA host, controls the entire data flow. Alternatively, the controller 9 can be configured as a DMA slave. In this case software triggers direct memory access by means of a DMA master that is connected to the bus system 3 but is not shown on the present drawing. In this case data is again transferred from the main memory to the buffer memory 8. An interrupt request signal must be generated here by the interface arrangement 24 in order to inform the control software about the status of the buffer memory 8. When further data can be transferred into the buffer memory 8 this software must initiate the next DMA transfer.

The buffer memory 8 serves to store the data that is transferred to a memory assigned to the microcontroller or from a memory of that sort to the proposed interface arrangement. At the same time the buffer memory serves to provide separation between the clock frequency of the microcontroller and of the connected bus system 3 on the one hand, and the clock on the signal line 5 used to connect external peripheral devices on the other hand. This allows the second data input and output interface 4 to be operated at a frequency other than the frequency of the microcontroller or the clock frequency of the microcontroller bus 3. This allows the full data transfer rate to be achieved at the I/O connection 4, independently of whatever bus clock frequency is being used at the time on the microcontroller bus 3. This is particularly favourable when variable clock frequencies are used to operate the microcontroller bus 3.

The controller 15 of the buffer memory 8 is designed to generate flags that indicate the following memory states: empty, almost empty, half full, almost full and full. These are used for the DMA and interrupt control described above. In order to control data output at the second data input and output interface 4, a DMA request is generated when the "almost empty" signal from buffer memory 8 is asserted. This causes the buffer memory 8 to be filled with the next block of data. When data is read from an external peripheral device through the second interface 4, a DMA request signal is generated when the "almost full" flag is asserted, as a result of which the buffer memory is emptied again over the bus 3. In further embodiments these flags can also be used as conditions to control an interrupt, so allowing the DMA transfer to be triggered by software.

The control signal generator 10 makes it possible to output data to peripheral devices through the interface 4, and to do so independently of a microcontroller connected to the bus 3, and also independently of the first register unit 6. The control signal generator 10 is highly programmable, as is explained in more detail below. Each of the control signals generated by the control signal generator 10 can be interpreted as an independent output channel, similar to the channels of a test device. These control channels can be generated by setting specific levels and by timestamps. A sequence of three level values and two timestamps are sufficient to be able to generate the usual signal formats, namely return-to-zero (RZ), return-to-one (RO), non-return-to-zero (NRZ) and non-return-to-one (NRO).

The value of the first timestamp here specifies the time of the switch from a first signal level to a second level. In a similar way, the second timestamp specifies the time at which the signal changes from the second signal level to a third signal level. The clock generator 20 serves to divide each cycle into k sub-cycles. The function of the number k is to specify the time resolution within a cycle. Control signals are generated for all the cycles in which the buffer memory is not empty. When the buffer memory 8 is empty, the interface arrangement is placed in an idling mode. In this idling mode, all the control signals are set to a programmable idling value. The control signal generator 10 also incorporates a blanking generator 21, also referred to as the mask generator. The mask generator makes it possible to generate signals that differ from one another in immediately succeeding cycles. Typical applications for such signals include control outputs that indicate data bytes with a high or low parity bit, all with odd or even parity. For masking, for instance, four immediately succeeding cycles may be grouped together. In this way it is also possible, by generating appropriate control signals, to output a 32-bit data word in one byte in parallel, and to indicate which byte is the first, second, third and fourth.

The second register unit 7 has a number of different purposes. On the one hand, serial/parallel conversion and parallel/serial conversion between the input and output data is achieved through the second interface 4 with registers 16, 17 and 18. The width of the buffer memory 8 can be implemented to match the bus width of the microcontroller bus 3 in order to optimize DMA access, and so that memory access in DMA mode and the transfer of data between the buffer memory 8 and a microcontroller memory can be achieved with maximum utilization of the microcontroller bus. The data flow with such a bit width can be serialized with the data output register 17. It is, for instance, possible to find that a microcontroller has a bus width of 32 bits while the width of the output data at the interface 4 is 16 or 8 bits. In order to carry out this serialization, i.e. the parallel-two-serial conversion, the data from buffer memory 8 is transferred to the data output register 17. After this, two or four cycles are used to create the actual output data at output 4 before the next word is written out of the buffer memory into the data output register. Similar considerations apply to the data input register 16. Two or four data words of sixteen or eight bits, for instance, maybe read at interface 4 into the data input register 16 before the data is written, with a width of 32 bits, into the buffer memory 8. The data input register 16 is favourably controlled by a strobe signal that is created in the control signal generator 10 by the strobe signal generator 22. A third function of the second register unit 7 concerns the buffer memory 18 for incoming and outgoing data. This buffer memory 18 is also controlled by control signals from the control signal generator 10. This permits the output not only to be set at a defined output level such as high or low, but also to a high-impedance tristate value.

This makes it possible at little expense to achieve a high data rate for the operation of peripheral devices with a system-on-chip, without placing demands on the microcontroller's computing power.

Figure 2:
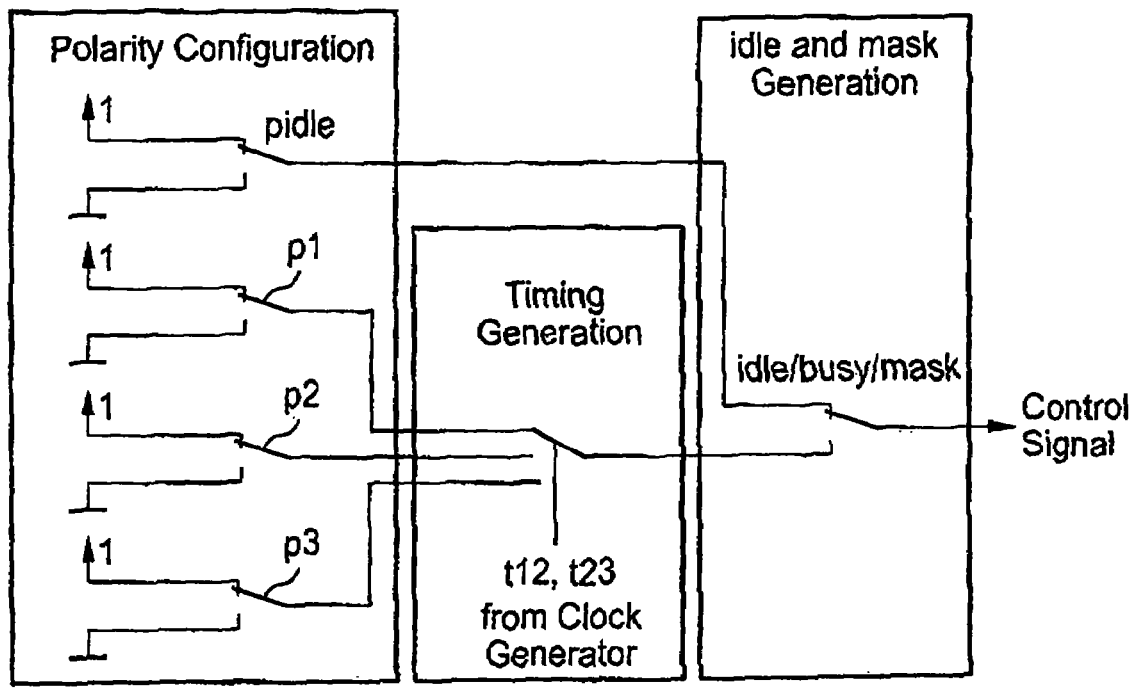
FIG. 2 shows an embodiment of a control signal generator according to an embodiment of the invention.

FIG. 2 shows an embodiment of the programmable signal generator 19 of FIG. 1. The signal levels p1, p2 and p3 are programmable. The times t12, t23 at which the signal level changes can also be programmed. It is of course also possible for there to be a smaller or larger number of sequential signal levels p1, p2, p3 along with a corresponding number of timestamps t12, t23 for signal transitions. Control signals of this sort are only generated when the buffer memory is not empty. Otherwise the interface arrangement operates in idling mode.

Idling signal levels are provided for this idling mode; these too are programmable, and are indicated in the present example by the idling level, pidle. In order to provide high flexibility for the operation of external peripheral devices, a masking function is provided. A mask generator determines the periods of time in which the control signals are set to the idling state, pidle, or to some other state. This is also referred to as blanking.

Figure 3:
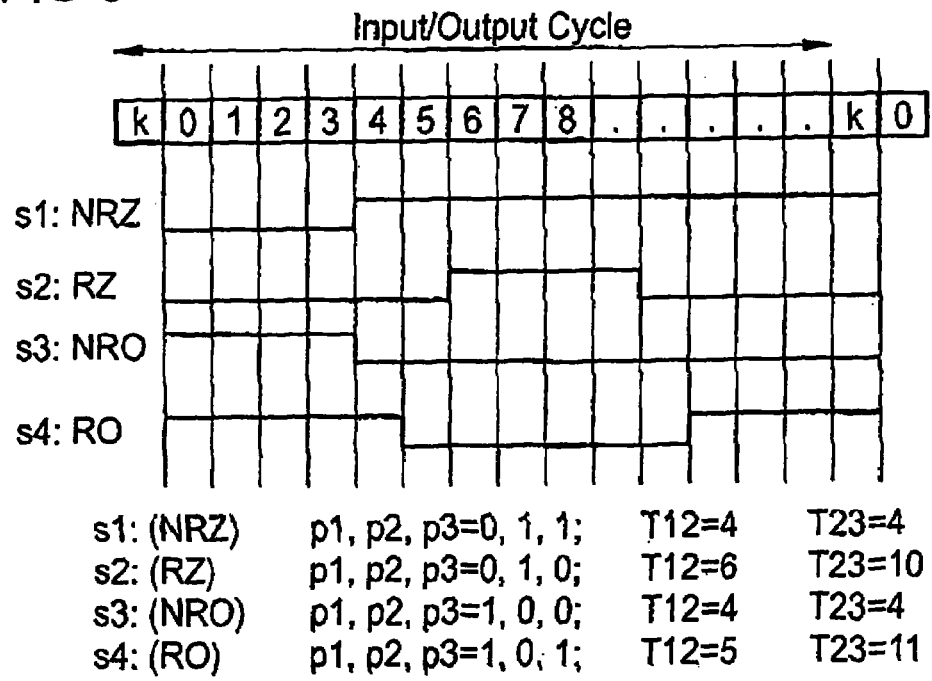
FIG. 3 shows the sequence of the control signals that can be generated by the circuit according to FIG. 2, in association with typical signal sequences.

FIG. 3 illustrates examples of the control signals generated by the arrangement according to FIG. 2. The input/output signal is shown here on the top line of the cycle. Underneath, examples of the following signal types are shown, labelled s1 to s4: an NRZ signal, an RZ signal, an NRO signal and an RO signal. In the table at the bottom edge of the illustration, the signal levels p1, p2, p3 and the switching times t12, t23 required to program the signals are listed.

Figure 4:
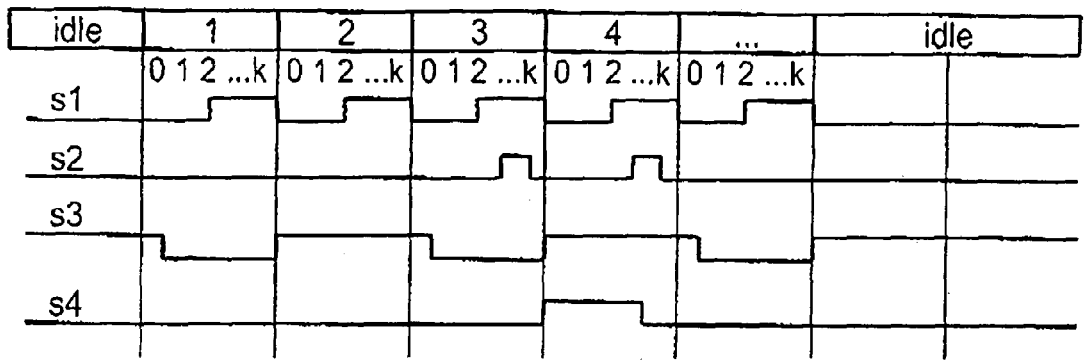
FIG. 4 shows examples of masking and idling mode of the control signals.

FIG. 4 shows an example of placing the control signals s1 to s4 into idling mode, and for masking the signals. The masking makes it possible to generate signals that have a corresponding mask in specific clock cycles. The bottom edge of the illustration provides examples of definitions of these states for signals S1 to S4.

Figure 5:
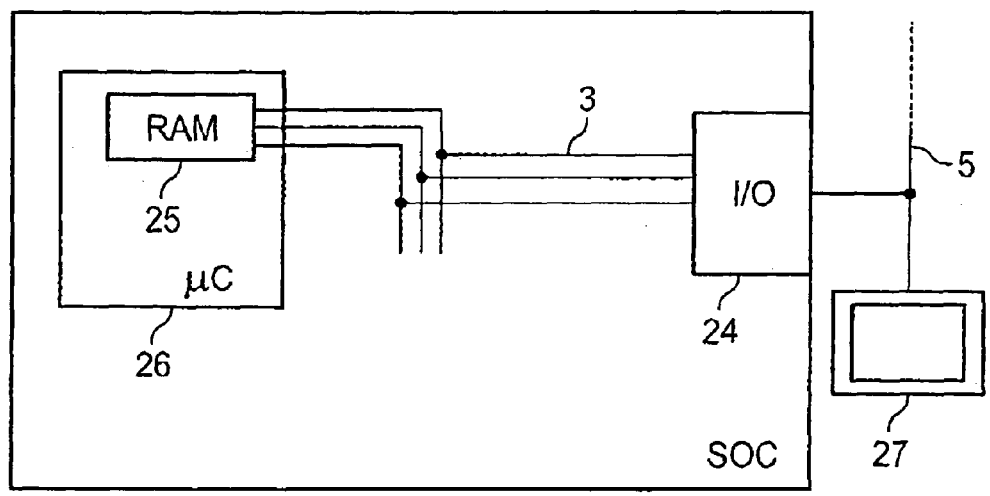
FIG. 5 shows an example of a block diagram of a system-on-chip preceded by an interface arrangement of the type disclosed herein.

FIG. 5 illustrates an example of a block diagram of a system-on-chip 3, 24, 25, 26 with a proposed interface arrangement 24. The interface arrangement 24, an example of which is shown in FIG. 1, is connected through the bus 3 to a microcontroller 26 that incorporates a memory component 25. At the second data input and output interface 4 of the interface arrangement a signal line 5 is connected to which an output device 27 is wired. Alternatively, of course, it is possible for several interface arrangements 24 to be connected to the microcontroller bus 3.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An interface arrangement, in particular for a system-on-chip, comprising:
    a first data input and output interface, configured for connection to a microcontroller bus;
    a second data input and output interface, configured for connection to a signal line for coupling to peripheral devices;
    a first register unit connected to the first data input and output interface;
    a second register unit connected to the second data input and output interface;
    a buffer memory that couples the first register unit to the second register unit;
    a controller for carrying out direct memory access, connected to the microcontroller bus and to the buffer memory; and
    a control signal generator configured to generate a control signal, connected to the signal line for coupling to peripheral devices and coupled to the second register unit.

2. The interface arrangement according to claim 1, wherein the control signal generator is connected to the buffer memory in order to operate it.

3. The interface arrangement according to claim 1, wherein the first register unit comprises several registers and the control block that is connected to the registers, in order to operate them, and to the microcontroller bus.

4. The interface arrangement according to claim 1, wherein the first register unit incorporates a generator for the generation of interrupt request signals and which is coupled to the microcontroller bus.

5. The interface arrangement according to claim 1, wherein the first register unit comprises the direct memory access controller.

6. The interface arrangement according to claim 1, wherein the buffer memory is a first-in-first-out memory.

7. The interface arrangement according to claim 1, wherein the buffer memory comprises a controller and a volatile memory coupled to it.

8. The interface arrangement according to claim 1, wherein the second register unit comprises a data input register and a data output register that are coupled to the buffer memory, and an input/output buffer memory that connects the data input register and the data output register with the signal line for coupling to peripheral devices.

9. The interface arrangement according to claim 1, wherein the control signal generator comprises a programmable signal generator, a clock generator and a generator for blanking when idling, wired together in order to generate a programmable control signal.

10. The interface arrangement according to claim 1, wherein the control signal generator comprises a generator for generating a sampling strobe signal.

11. The interface arrangement according to claim 1, wherein the control signal generator is configured to generate a control signal of at least one or more of these types: non-return-to-zero, return-to-zero, return-to-one, non-return-to-one.

12. The interface arrangement according to claim 1, wherein
    the control signal generator comprises means for programming a sequence of at least two signal levels;
    the control signal generator comprises means for programming at least one timestamp for the sequence of at least two signal levels; and
    the control signal generator comprises means for masking the sequence of at least two signal levels.

13. The interface arrangement according to claim 1, wherein the microcontroller bus comprises at least one data line, one address line, and one control line.

14. A system-on-chip for coupling a microprocessor with a peripheral device comprising an interface arrangement according to claim 1.

15. The interface arrangement according to claim 4, wherein the buffer memory is connected to the generator for the generation of interrupt request signals in order to operate it.

16. The interface arrangement according to claim 7, wherein the controller comprised within the buffer memory is connected to the generator for the generation of interrupt request signals in order to operate it.

17. The interface arrangement according to claim 9, wherein the programmable signal generator is connected to the data input register, the data output register, and the input/output buffer memory in order to operate them.

18. The interface arrangement according to claim 9 wherein the programmable signal generator is connected to the buffer memory in order to operate it.

* * * * *